United States Patent
Qiu et al.

(10) Patent No.: US 12,014,069 B2
(45) Date of Patent: Jun. 18, 2024

(54) ABNORMALITY DETECTING SYSTEM, MOTHERBOARD, AND ELECTRONIC DEVICE

(71) Applicant: Fulian Precision Electronics (Tianjin) Co., LTD., Tianjin (CN)

(72) Inventors: Duo Qiu, Tianjin (CN); Jun-Lan Liu, Tianjin (CN)

(73) Assignee: Fulian Precision Electronics (Tianjin) Co., LTD., Tianjin (CN)

(*) Notice: Subject to any disclaimer, the term of this patent is extended or adjusted under 35 U.S.C. 154(b) by 27 days.

(21) Appl. No.: 18/072,531

(22) Filed: Nov. 30, 2022

(65) Prior Publication Data
US 2024/0069786 A1 Feb. 29, 2024

(30) Foreign Application Priority Data
Aug. 31, 2022 (CN) .......................... 202211059208.1

(51) Int. Cl.
*G06F 3/06* (2006.01)
(52) U.S. Cl.
CPC .......... *G06F 3/0653* (2013.01); *G06F 3/0619* (2013.01); *G06F 3/0683* (2013.01)
(58) Field of Classification Search
CPC ..... G06F 3/0653; G06F 3/0619; G06F 3/0683

USPC .................................................. 711/154, 100
See application file for complete search history.

(56) References Cited

U.S. PATENT DOCUMENTS

2021/0286667 A1* 9/2021 Yigzaw ............... G06F 11/0751

FOREIGN PATENT DOCUMENTS

JP 2013156942 * 8/2013 ............... G06F 1/28

* cited by examiner

*Primary Examiner* — David Yi
*Assistant Examiner* — Zubair Ahmed
(74) *Attorney, Agent, or Firm* — ScienBiziP, P.C.

(57) ABSTRACT

An abnormality detecting system is provided. The abnormality detecting system includes a processor, a control module, a storage device and a monitoring module. The storage device includes a plurality of storage units. The processor is electrically connected to each storage unit of the plurality of storage units through the control module, the monitoring module is electrically connected to the processor, the control module and the each storage unit. The monitoring module obtains a monitoring result by monitoring a level state of signals generated by the control module, the each storage unit, and the processor; and the monitoring module confirming whether an abnormality occurs according to the monitoring result.

18 Claims, 3 Drawing Sheets

ABNORMALITY DETECTING SYSTEM, MOTHERBOARD, AND ELECTRONIC DEVICE

FIELD

The subject matter relates to a field of device monitoring, and in particular, to an abnormality detecting system, a motherboard, and an electronic device.

BACKGROUND

The development of big data and cloud computing lead organizations such as enterprises and scientific research units to increase their demand for additional storage capacity. Therefore, an amount of storage devices in a server is increasing. However, since each storage device is connected to a mainboard of the server, when one of the storage devices runs abnormally, it is difficult to quickly locate the abnormal storage device.

BRIEF DESCRIPTION OF THE DRAWINGS

Many aspects of the disclosure can be better understood with reference to these drawings. The components in the drawings are not necessarily drawn to scale, the emphasis instead being placed upon clearly illustrating the principles of the disclosure. In the drawings, like reference numerals designate corresponding portions throughout the several views.

DETAILED DESCRIPTION

Figure 1:
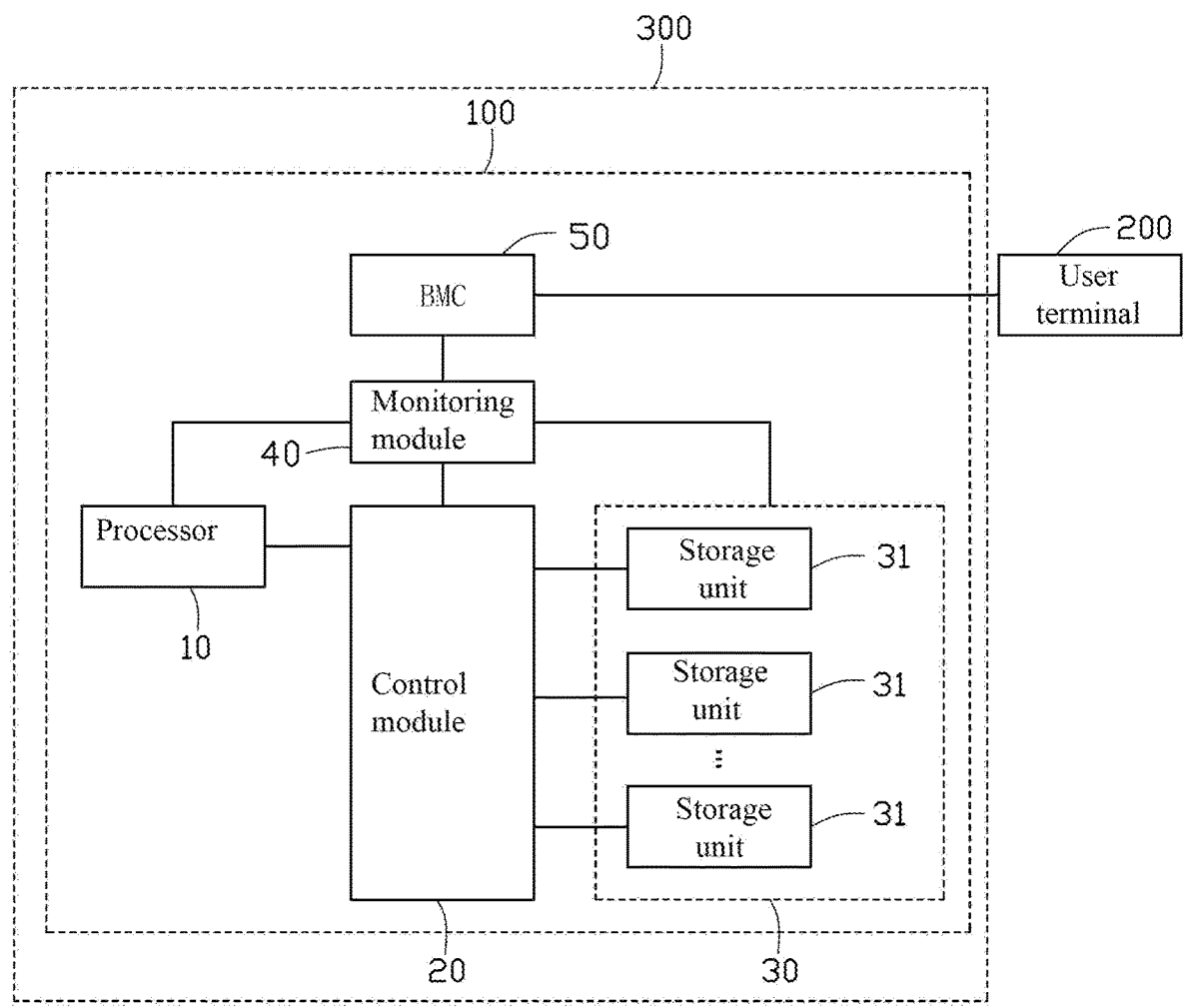
FIG. 1 is a structural block diagram of an abnormality detection system according to an embodiment of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work fall within the protection scope of the present disclosure.

It should be noted that when an element is referred to as being "electrically connected" to another element, it can be directly on the other element or via an intervening element. When an element is considered to be "electrically connected" to another element, it can be a contact connection, such as a wire connection, or a contactless connection, such as a contactless coupling.

Unless otherwise defined, all technical and scientific terms used herein have the same meaning as commonly understood by one of ordinary skill in the art to which this disclosure belongs. The terms used herein in the description of the present disclosure are for the purpose of describing specific embodiments only, and are not intended to limit the present disclosure.

Some embodiments of the present disclosure will be described in detail below with reference to the accompanying drawings. The embodiments described below and features in the embodiments may be combined with each other without conflict.

The development of big data and cloud computing leads organizations such as enterprises and scientific research units to increase their demand for a storage capacity. Therefore, an amount of storage devices in a server is increasing. For example, with the development of storage technology, 64 Dual-Inline-Memory-Modules (DIMMs) can be installed in a server, and the DIMM can be a storage device conforming to a specification of the DDR5. However, since each storage device needs to be connected to a processor in the server, when a storage device runs abnormally, it is difficult to quickly locate the abnormal storage device, and requires a lot of manpower and material resources to detect the storage device.

In order to solve at least one of the above problems, please refer to FIG. 1, an embodiment of the present disclosure provides a detection system 100 for detecting an abnormal storage device (hereinafter referred to as "abnormality detection system 100), which runs in an electronic device 300. The electronic device 300 may be a desktop computer, a notebook computer, a tablet computer, a personal digital assistant (PDA), a smart phone, a gaming appliance, a server computer, and the like.

In the embodiment of the present disclosure, the abnormality detection system 100 includes, but is not limited to, a processor 10, a control module 20, a storage device 30, and a monitoring module 40. Wherein, the processor 10 is electrically connected to the storage device 30 through the control module 20. The control module 20 enters a corresponding state after the electronic device 300 is powered on, so as to cooperate with a working state of the processor 10. The processor 10 confirms a working state with the storage device 30 through the control module 20 and the storage device 30, and then retrieves the data stored in the storage device 30 or controls the storage device 30 to perform corresponding operations. The storage device 30 includes a plurality of storage units 31. Each of the plurality of storage units 31 is electrically connected to the control module 20. That is, in the embodiment of the present disclosure, the plurality of storage units 31 are connected in parallel to the control module 20. The processor 10 is electrically connected to each of the plurality of storage units 31 through the control module 20. In this way, the processor 10 can confirm a working state of any one of the plurality of storage units 31 through the control module 20. The monitoring module 40 is electrically connected to the processor 10, the control module 20 and each storage unit 31, and monitors a signal between each storage unit 31 and the control module 20. The monitoring module 40 further monitors a level state of the signal and obtains a monitoring result, and confirms whether an abnormality occurs according to the monitoring result, and generates a corresponding monitoring log.

The abnormality detection system 100 provided by the present disclosure can be integrated on a motherboard (MB). When the motherboard provided with the abnormality detection system 100 is installed on a computer, the storage device 30 can be monitored in real time while controlling the computer to realize corresponding functions.

It can be understood that the processor 10 is an operation and control core of the electronic device 300, and is used for executing computer instructions and processing data in computer software. In this embodiment, the processor 10 may be a central processing unit (CPU).

In this embodiment, the control module 20 and the monitoring module 40 may be integrated on a complex programmable logic device (CPLD). In other embodiment, the control module 20 and the monitoring module 40 may be separately integrated on different CPLDs.

It can be understood that the storage device 30 is used for storing data and programs. In this embodiment, the storage device 30 may be a double data rate synchronous dynamic random access memory (DDR SDRAM). For example, the storage device 30 may be the fifth generation double data rate synchronous dynamic random access memory (DDR5 SDRAM).

In the embodiment of the present disclosure, each storage unit 31 is a Dual-Inline-Memory-Modules (DIMM). Wherein, after the electronic device 300 is powered on, the control module 20 sequentially enters a first state (e.g., ST_IDLE state), a second state (e.g., ST_DDRIO state), a third state (e.g., ST_LINK state) and a fourth state (e.g., ST_FAULT status). In the embodiment of the present disclosure, the first state is an initial state, the second state is a to-be-activated state, the third state is a connected state, and the fourth state is a fault state.

Figure 2:
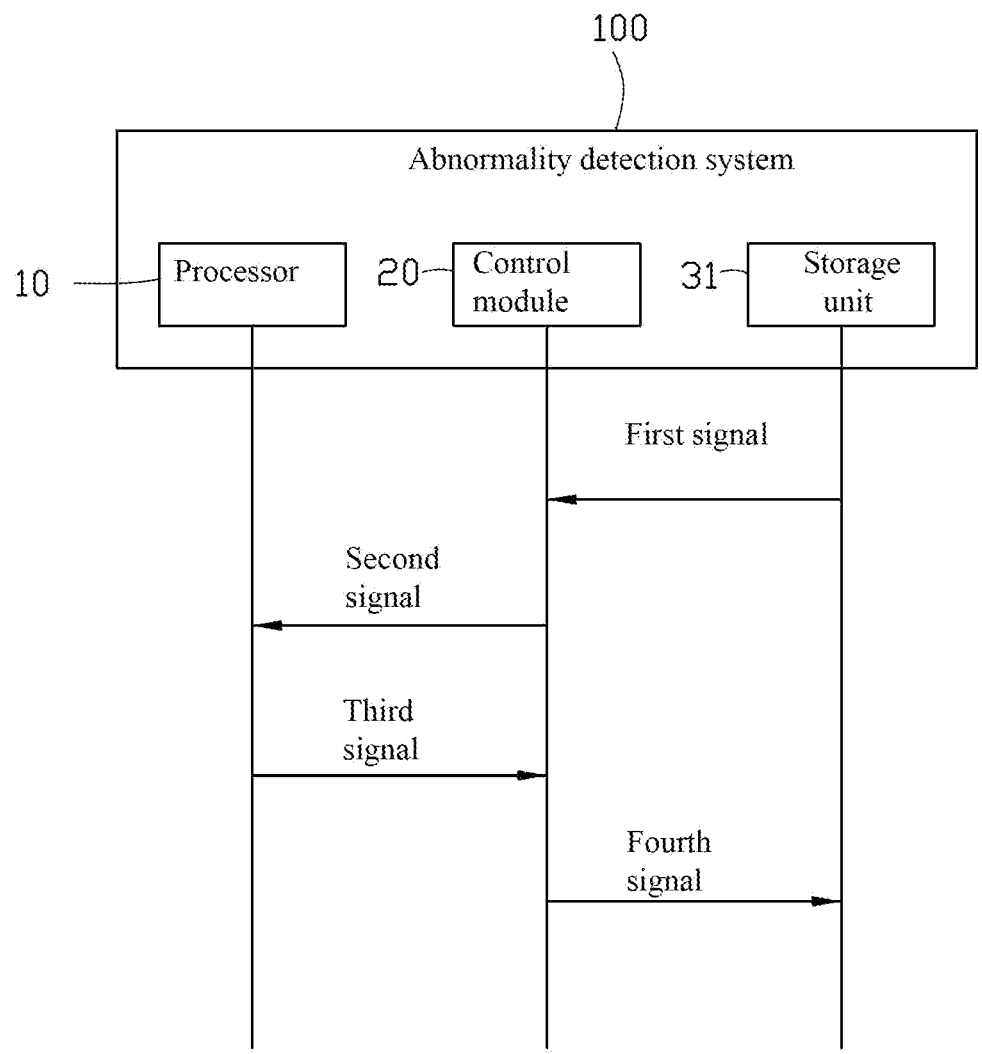
FIG. 2 is a signal flow diagram of the abnormality detection system shown in FIG. 1.

Please refer to FIG. 2, for any one of the plurality of storage units 31, after the electronic device 300 is powered on and the control module 20 enters the third state, the any one storage unit 31 outputs a first signal to the control module 20. When the control module 20 receives the first signal, the control module 20 outputs a second signal to the processor 10. In this way, when the processor 10 receives the second signal, the processor 10 confirms that the any one storage unit 31 has been powered on, and can start to work normally.

When the processor 10 receives the second signal, the processor 10 outputs a third signal to the control module 20. When the control module 20 receives the third signal, the control module outputs a fourth signal to the any one storage unit 31. In this way, when the any one the storage unit 31 receives the fourth signal, the any one the storage unit 31 confirms that the processor 10 is working normally. In this way, the processor 10 can perform operations such as data retrieval or writing data to the any one storage unit 31. In the embodiment of the present disclosure, when the electronic device 300 is in operation, and the control module 20 is in the third state, and the monitoring module 40 monitors that a level state of at least one of the first signal, the second signal, the third signal, and the fourth signal is a first level (e.g., a low level), the monitoring module 40 determines that an abnormality occurs. When the control module 20 is in the fourth state, the monitoring module 40 determines that the storage device 30 is abnormal. However, when the control module 20 is in a state other than the fourth state, the monitoring module 40 determines a cause of the abnormality based on the level state of each of the first signal, the second signal, the third signal, the third signal, and the four signal, and the state of the control module 20.

For example, the embodiments of the present disclosure illustrate a method for determining faults in different states through the following scenarios.

A first scenario: during the operation of the electronic device 300, when the monitoring module 40 monitors that the level state of the first signal output by any one of the plurality of storage units 31 is the first level, and the control module 20 is in the fourth state, the monitoring module 40 determines that the any one storage unit 31 is abnormal.

A second scenario: during the operation of the electronic device 300, when the monitoring module 40 monitors that the level state of the first signal is the first level, and the control module 20 is in the first state or the second state, the monitoring module 40 determines that the control module 20 is abnormal.

A third scenario: during the operation of the electronic device 300, when the monitoring module 40 monitors that the level state of the first signal is a second level (e.g., a high level), the level state of the second signal is the first level, and the control module 20 is in the third state, the monitoring module 40 determines that the control module 20 is abnormal.

A fourth scenario: during the operation of the electronic device 300, when the monitoring module 40 monitors that the level state of each of the first signal and the second signal is the second level, the level state of the third signal is the first level, and the control module 20 is in the third state, the monitoring module 40 determines that the processor 10 is abnormal; when the monitoring module 40 monitors that the control module 20 is in the third state, the level state of each of the first signal, the second signal, and the third signal is the second level, and the level state of the fourth signal is the first level, the monitoring module 40 determines that the control module 20 is abnormal.

It can be understood that, in the embodiments of the present disclosure, the monitoring module 40 can monitor whether the level state of the corresponding signal (e.g., the first signal, the second signal, the third signal, and the fourth signal) is the first level (i.e., confirming whether the corresponding signal generates a falling edge), and can monitor the state of the control module 20 to confirm whether a corresponding electronic component (e.g., the processor 10, or the storage unit 31) or a related line is abnormal.

Referring to FIG. 1 again, in some embodiments, the anomality detection system 100 further includes a baseboard management controller (BMC) 50. The monitoring module 40 includes a plurality of registers (not shown), and the plurality of registers respectively correspond to the plurality of storage units 31. The monitoring module 40 records the level state of each of the first signal, the second signal, the third signal, and the fourth signal corresponding to each storage unit 31 using the corresponding register. In the embodiment of the present disclosure, when the monitoring module 40 detects that the level state of any one of the first signal, the second signal, the third signal and the fourth signal corresponding to the any one storage units 31 is the first level, the monitoring module 40 assigns a value to a register corresponding to the any one storage units 31. The plurality of registers are electrically connected to the BMC 50 through a bidirectional two-wire synchronous serial bus (Inter-Integrated Circuit, I2C), so as to output values of the plurality of registers to the BMC 50 to record the level state of each of the first signal, the second signal, the third signal, and the fourth signal. In this way, the BMC 50 can generate a corresponding detection log.

In the embodiment of the present disclosure, the BMC 50 is also electrically connected to the user terminal 200, such as another computer, through a USB interface. In this way, a technician can view relevant logs through the user terminal 200 to determine an abnormal component during a working process of the electronic device 300. Further, when the electronic device 300 confirms that the storage device 30 is abnormal during the operation of the electronic device 300, the technician can check the log through the user terminal 200 to determine an abnormal storage unit 31, which effectively reduces a labor cost and a time cost of maintenance.

In the embodiment of the present disclosure, each storage unit 31 is further provided with a corresponding number. Data output by the register corresponding to each storage unit 31 includes the corresponding number. In this way, the monitoring module 40 can output relevant data of each storage unit 31 corresponding to each register through each register, the relevant data includes, but is not limited to, the number of the corresponding storage unit 31 and the level state of the corresponding signal. The relevant data can be used to assist a determination of the abnormal storage unit 31, thereby effectively reducing the time cost and labor cost during detection and maintenance.

It can be understood that the present disclosure does not limit a type of the monitoring module 40. For example, in other embodiments, the monitoring module 40 may be a field programmable gate array (FPGA), a single-chip microcomputer, or a programmable controller.

It can be understood that, the monitoring module 40 is configured to record the level state of each of the first signal, the second signal, the third signal and the fourth signal during the operation of the electronic device 300, and analyze the level state, so that the components that are abnormal during the operation of the electronic device 300 can be confirmed. The abnormality detection system 100 provided by the present disclosure is convenient to operate and can effectively reduce maintenance costs.

Figure 3:
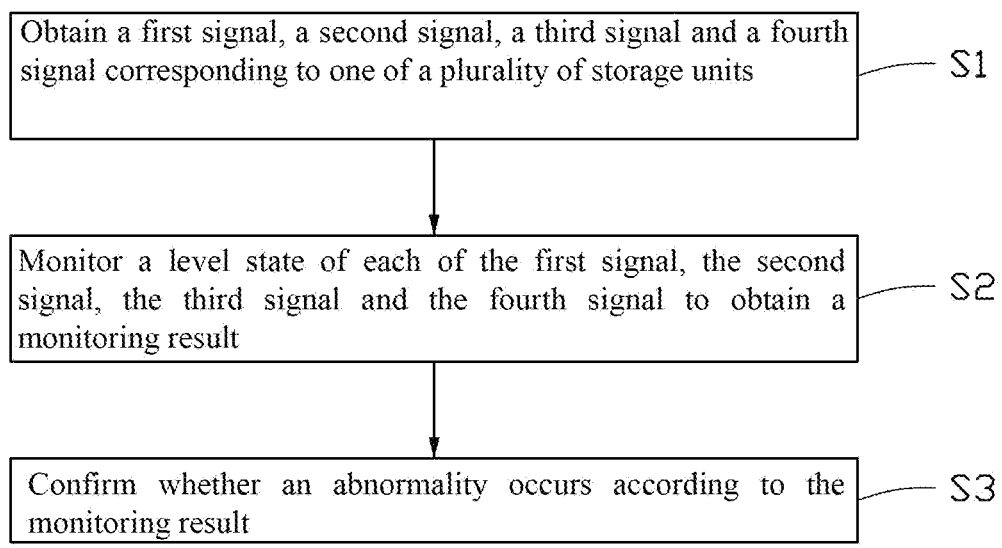
FIG. 3 is a schematic flowchart of an abnormality detection method provided by an embodiment of the present disclosure.

Please continue to refer to FIG. 3, an embodiment of the present disclosure further provides an abnormality detection method, which is applied to the abnormality detection system 100 shown in FIG. 1, to detect whether an abnormality occurs in the storage device 30 of the electronic device 300. The abnormality detection system 100 includes the processor 10, the monitoring module 40, and the storage device 30 including the plurality of storage units 31 which are electrically connected in sequence. The abnormality detection method includes the following blocks:

At block S1, during the working process of the electronic device 300, for any one of the plurality of storage units 31, the monitoring module 40 obtains the first signal, the second signal, the third signal and the fourth signal corresponding to the any one storage unit 31, wherein the first signal refers to a signal output by the any one storage unit 31 to the control module 20, and the second signal refers to a signal output by the control module 20 to the processor 10 in response to the first signal, the third signal refers to a signal output by the processor 10 to the control module 20 in response to the second signal, and the fourth signal is a signal output by the control module 20 to the any one storage unit 31 in response to the third signal.

It can be understood that, a specific flow between the first signal, the second signal, the third signal and the fourth signal corresponding to the any one storage unit 31, please refer to the above description of FIG. 2, and details are not repeated here.

At block S2, the monitoring module 40 monitors the level state of each of the first signal, the second signal, the third signal and the fourth signal to obtain a monitoring result.

At block S3, the monitoring module 40 confirms whether an abnormality occurs according to the monitoring result.

It can be understood that at block S3, the level state includes a first level and a second level. In the embodiment of the present disclosure, the first level refers to a low level, and the second level refers to a high level.

In one embodiment, the monitoring module 40 may confirm whether an abnormality occurs according to the monitoring result and the state of the control module 20.

In one embodiment, when the control module 20 is in the fourth state and the monitoring result indicates that the level state of the first signal corresponding to the any one storage units 31 is the first level, the monitoring module 40 can determine that the any one storage unit 31 is abnormal.

In one embodiment, when the monitoring result indicates that the level state of the first signal is the first level, and the control module 20 is in the first state or the second state, the monitoring module 40 can determine that the control module 20 is abnormal.

In one embodiment, when the monitoring result indicates that the level state of the first signal is the second level, the level state of the second signal is the first level, and the control module 20 is in the third state, the monitoring module 40 may determine that the control module 20 is abnormal.

In one embodiment, when the monitoring result indicates that the level state of each of the first signal and the second signal is the second level, the level state of the third signal is the first level, and the control module 20 is in the third state, the monitoring module 40 can determine that the processor 10 is abnormal; when the control module 20 is in the third state, and the monitoring result indicates that the level state of each of the first signal, the second signal and the third signal is the second level, and the level state of the fourth signal is the first level, the monitoring module 40 can determine that the control module 20 is abnormal.

It can be understood that each module included in the above-mentioned embodiments can be integrated into a computer device or a computer tool, or can be set as a separate functional entity, and each module is connected with the computer device or the computer tool, and provides a functionality of the each module.

It is worth noting that the modules included in the above apparatus embodiments are only divided according to a functional logic, and are not limited to the above division, as long as the corresponding functions can be implemented. In addition, the specific names of the functional modules are only for the convenience of distinguishing from each other, and are not used to limit the protection scope of the present disclosure.

The above embodiments are only used to illustrate the technical solutions of the present disclosure and not to limit them. Although the present disclosure has been described in detail with reference to the above preferred embodiments, those of ordinary skill in the art should understand that the technical solutions of the present disclosure can be modified or equivalently replaced. Neither should depart from the spirit and scope of the technical solutions of the present disclosure. Those skilled in the art can also make other changes within the spirit of the present disclosure, etc. In the design of the present disclosure, as long as they do not deviate from the technical effects of the present disclosure. These changes made in accordance with the spirit of the present disclosure should be included within the scope of protection claimed in the present disclosure.

What is claimed is:

1. An abnormality detecting system, comprising a processor, a control module, a storage device and a monitoring module, the storage device comprising a plurality of storage units;
    the processor being electrically connected to each of the plurality of storage units through the control module, the monitoring module being electrically connected to the processor, the control module and each of the plurality of storage units;
    the monitoring module obtaining a monitoring result by monitoring a level state of signals generated by the control module, each of the plurality of storage units, and the processor; and the monitoring module confirming whether an abnormality occurs according to the monitoring result;
wherein the monitoring module obtains a first signal, a second signal, a third signal and a fourth signal corresponding to each of the plurality of storage units;
each of the plurality of storage units outputs the first signal to the control module when the abnormality detecting system is powered on;
the control module outputs the second signal to the processor in response to the first signal;
the processor outputs the third signal to the control module in response to the second signal; and
in response to the third signal, the control module outputs the fourth signal to corresponding storage unit.

2. The abnormality detecting system according to claim 1, wherein the monitoring module confirms whether the abnormality occurs according to the monitoring result and a state of the control module, wherein the control module sequentially enters a first state, a second state, a third state, and a fourth state when the abnormality detecting system is powered on.

3. The abnormality detecting system according to claim 2, wherein when the control module is in the fourth state and the monitoring result indicates that the level state of the first signal corresponding to one of the plurality of storage units is a first level, the monitoring module determines that the one of the plurality of storage units is abnormal.

4. The abnormality detecting system according to claim 2, wherein when the monitoring result indicates that the level state of the first signal is a first level, and the control module is in the first state or the second state, the monitoring module determines that the control module is abnormal.

5. The abnormality detecting system according to claim 2, wherein when the monitoring result indicates that the level state of the first signal is a second level, a level state of the second signal is a first level, and the control module is in the third state, the monitoring module determines that the control module is abnormal.

6. The abnormality detecting system according to claim 2, wherein when the monitoring result indicates that the level state of each of the first signal and the second signal is a second level, the level state of the third signal is a first level, and the control module is in the third state, the monitoring module determines that the processor is abnormal;
wherein when the control module is in the third state, and the monitoring result indicates that a level state of each of the first signal, the second signal and the third signal is the second level, and a level state of the fourth signal is the first level, the monitoring module determines that the control module is abnormal.

7. The abnormality detecting system according to claim 2, wherein the monitoring module comprises a plurality of registers, and the plurality of registers respectively correspond to the plurality of storage units; the monitoring module records the level state of each of the first signal, the second signal, the third signal, and the fourth signal corresponding to each of the plurality of storage units using the corresponding register.

8. The abnormality detecting system according to claim 7, further comprising:
a baseboard management controller (BMC);
the plurality of registers electrically connected to the BMC;
wherein when the monitoring module detects that the level state of one of the first signal, the second signal, the third signal and the fourth signal corresponding to one of the plurality of storage units is the first level, the monitoring module assigns a value to a register corresponding to the one of the plurality of storage units; and
the register corresponding to the one of the plurality of storage units outputs the value to the BMC.

9. The abnormality detecting system according to claim 8, wherein each of the plurality of storage units is provided with a number, the monitoring module outputs relevant data of each of the plurality of storage units through a corresponding register, the relevant data comprises the number of each of the plurality of storage units and the level state of the signals corresponding each of the plurality of storage units.

10. A motherboard comprising an abnormality detecting system, the abnormality detecting system comprising a processor, a control module, a storage device and a monitoring module, the storage device comprising a plurality of storage units;
the processor electrically connected to each of the plurality of storage units through the control module, the monitoring module being electrically connected to the processor, the control module and each of the plurality of storage units;
the monitoring module obtaining a monitoring result by monitoring a level state of signals generated by the control module, each of the plurality of storage units, and the processor, and
the monitoring module confirming whether an abnormality occurs according to the monitoring result;
wherein the monitoring module obtains a first signal, a second signal, a third signal and a fourth signal corresponding to each of the plurality of storage units;
each of the plurality of storage units outputs the first signal to the control module when the abnormality detecting system is powered on;
the control module outputs the second signal to the processor in response to the first signal;
the processor outputs the third signal to the control module in response to the second signal; and
in response to the third signal, the control module outputs the fourth signal to corresponding storage unit.

11. The motherboard according to claim 10, wherein the monitoring module confirms whether the abnormality occurs according to the monitoring result and a state of the control module, wherein the control module sequentially enters a first state, a second state, a third state, and a fourth state when the abnormality detecting system is powered on.

12. The motherboard according to claim 11, wherein when the control module is in the fourth state and the monitoring result indicates that the level state of the first signal corresponding to one of the plurality of storage units is a first level, the monitoring module determines that the one of the plurality of storage units is abnormal.

13. The motherboard according to claim 11, wherein when the monitoring result indicates that the level state of the first signal is a first level, and the control module is in the first state or the second state, the monitoring module determines that the control module is abnormal.

14. The motherboard according to claim 11, wherein when the monitoring result indicates that the level state of the first signal is a second level, a level state of the second signal is a first level, and the control module is in the third state, the monitoring module determines that the control module is abnormal.

15. The motherboard according to claim 11, wherein when the monitoring result indicates that the level state of each of the first signal and the second signal is a second level, the level state of the third signal is a first level, and the control module is in the third state, the monitoring module determines that the processor is abnormal;

wherein when the control module is in the third state, and the monitoring result indicates that a level state of each of the first signal, the second signal and the third signal is the second level, and a level state of the fourth signal is the first level, the monitoring module determines that the control module is abnormal.

16. The motherboard according to claim 11, wherein the monitoring module comprises a plurality of registers, and the plurality of registers respectively correspond to the plurality of storage units; the monitoring module records the level state of each of the first signal, the second signal, the third signal, and the fourth signal corresponding to each of the plurality of storage units using the corresponding register.

17. The motherboard according to claim 16, further comprising:

a baseboard management controller (BMC);

the plurality of registers electrically connected to the BMC;

wherein when the monitoring module detects that the level state of one of the first signal, the second signal, the third signal and the fourth signal corresponding to one of the plurality of storage units is the first level, the monitoring module assigns a value to a register corresponding to the one of the plurality of storage units; and the register corresponding to the one of the plurality of storage units outputs the value to the BMC.

18. An electronic device comprising an abnormality detecting system, the abnormality detecting system comprising a processor, a control module, a storage device and a monitoring module, the storage device comprising a plurality of storage units;

the processor being electrically connected to each of the plurality of storage units through the control module, the monitoring module being electrically connected to the processor, the control module and each of the plurality of storage units;

the monitoring module obtaining a monitoring result by monitoring a level state of signals generated by the control module, each of the plurality of storage units, and the processor; and the monitoring module confirming whether an abnormality occurs according to the monitoring result;

wherein the monitoring module obtains a first signal, a second signal, a third signal and a fourth signal corresponding to each of the plurality of storage units;

each of the plurality of storage units outputs the first signal to the control module when the abnormality detecting system is powered on;

the control module outputs the second signal to the processor in response to the first signal;

the processor outputs the third signal to the control module in response to the second signal; and in response to the third signal, the control module outputs the fourth signal to corresponding storage unit.

* * * * *